United States Patent
Gross et al.

(10) Patent No.: US 12,003,425 B2
(45) Date of Patent: Jun. 4, 2024

(54) NETWORK INTERFACE WITH RESOURCE COORDINATOR

(71) Applicant: Texas Instruments Incorporated, Dallas, TX (US)

(72) Inventors: Nir Shlomo Gross, Givhat-Shmuel (IL); Israel Zilbershmidet, Netanya (IL); Barak Cherches, Ramat Ha'Kovesh (IL); David Levy, Kiryat Gat (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/386,735

(22) Filed: Jul. 28, 2021

(65) Prior Publication Data

US 2023/0032563 A1 Feb. 2, 2023

(51) Int. Cl.
| | |
|---|---|
| *H04L 47/762* | (2022.01) |
| *H04L 9/40* | (2022.01) |
| *H04L 47/70* | (2022.01) |
| *H04L 47/78* | (2022.01) |
| *H04L 47/80* | (2022.01) |

(52) U.S. Cl.
CPC .......... *H04L 47/762* (2013.01); *H04L 47/781* (2013.01); *H04L 47/808* (2013.01); *H04L 47/821* (2013.01); *H04L 63/166* (2013.01)

(58) Field of Classification Search
CPC ... H04L 47/762; H04L 47/781; H04L 47/808; H04L 47/821; H04L 63/166
See application file for complete search history.

(56) References Cited

U.S. PATENT DOCUMENTS

| | | | | |
|---|---|---|---|---|
| 2015/0350246 | A1* | 12/2015 | Bergman | H04L 67/568 726/14 |
| 2018/0337887 | A1* | 11/2018 | Aluvala | H04L 47/2433 |
| 2022/0060456 | A1* | 2/2022 | Chaubey | H04L 63/168 |

OTHER PUBLICATIONS

Texas Instruments. "CC3200 SimpleLink™ Wi-Fi® and Internet-of-Things Solution, a Single-Chip Wireless MCU." SWAS032F—Jul. 2013—Revised Feb. 2015. pp 1-72.

* cited by examiner

*Primary Examiner* — Jung H Park
(74) *Attorney, Agent, or Firm* — Mandy Barsilai Fernandez; Frank D. Cimino

(57) ABSTRACT

An integrated circuit includes: a processor; a receiver coupled to the processor; and memory coupled to the processor. The memory stores resource coordinator instructions that, when executed by the processor, cause the processor to: maintain a plurality of active secure sessions; identify a priority session trigger; and allocate receiver resources for incoming packets related to the plurality of active secure sessions based on the priority session trigger.

23 Claims, 4 Drawing Sheets

NETWORK INTERFACE WITH RESOURCE COORDINATOR

BACKGROUND

As new electronic devices are developed and integrated circuit (IC) technology advances, new IC products are commercialized. One example IC product for electronic devices includes a microprocessor and a network interface. In this example IC product, the microprocessor is configured to execute user applications, and the network interface is configured to send/receive information related to ongoing operations of the microprocessor, peripheral interfaces, or other data sources/sinks coupled to the network interface. The network interface includes support for communication protocols such as Transmission Control Protocol (TCP) and compatible security protocols such as Transport Layer Security (TLS).

TLS is a protocol that provides a security connection between peers on a network and typically runs over a TCP connection. Such TCP and TLC connections may involve a client and a server. Used widely for internet communications, TLS includes a handshake and a data path. The handshake allows the server and client to authenticate each other and to exchange keys over an insecure network. The data path is operational only after successful completion of the handshake. From that point, all messages are secured and authenticated. TLS also calls for a TLS record to encapsulate data path messages after the handshake is completed. The TLS record header includes a record size, which could be up to 16K bytes.

While ICs that support TLS connections are known, the number of TLS connections for networking applications and the overall throughput while complying with IC cost and size targets is lacking. For example, conventional memory resource allocation for TLS connections makes the above-noted IC performance, cost, and size targets difficult. In one conventional approach, secure session handling results in a receiver (Rx) memory pool being fully used and yet related TLS sessions are incomplete. In this scenario, the TLS records for the TLS sessions cannot be completed without increasing the RX memory pool.

SUMMARY

In one example embodiment, an integrated circuit comprises: a processor; a receiver coupled to the processor; and memory coupled to the processor. The memory stores resource coordinator instructions that, when executed by the processor, cause the processor to: maintain a plurality of active secure sessions; identify a priority session trigger; and allocate receiver resources for incoming packets related to the plurality of active secure sessions based on the priority session trigger.

In another example embodiment, a system comprises: a processor; and a network interface coupled to the processor. The network interface is configured to: maintain a plurality of active secure sessions; identify a priority session trigger; and allocate resources for incoming packets related to the plurality of active secure sessions based on the priority session trigger.

In yet another example embodiment, a method performed by an integrated circuit (IC) with a network interface comprises: maintaining, by the IC, a plurality of active secure sessions using the network interface; identifying, by the IC, a priority session trigger; and allocating, by the IC, memory resources for incoming packets related to the plurality of active secure sessions based on the priority session trigger.

BRIEF DESCRIPTION OF THE DRAWINGS

The same reference numbers are used in the drawings to designate the same or similar (structurally and/or functionally) features.

DETAILED DESCRIPTION

In some example embodiments, a circuit with a network interface is configured to provide resource coordination for secure sessions and related incoming packets. In some example embodiments, the circuit is an integrated circuit (ICs) with on-chip components (e.g., a host processor and/or other components) as well as the network interface. The network interface supports communication protocols (e.g., Transmission Control Protocol (TCP)) and compatible security protocols (e.g. Transport Layer Security (TLS)). TLS is a middleware layer between application and TCP layers. In operation, the TLS layer builds records from data received from an upper layer and forwards the record to the TCP layer for transmission. The TLS layer is unaware of TCP windows and the decision to build a long record or a small one is a consequence of the received data stream from the upper layer. The TLS record length may be up to 16 k bytes and a common TCP maximum segment size (MSS) is 1460 bytes, so a TLS record may include several TCP segments. At the receiver side, TLS record processing may start, but cannot be completed, without all related portions. Accordingly, the related portions are buffered by the receiver until all portions are received and TLS record processing is completed. After completion, the TLS record is transferred from the receiver to higher network layers (e.g., an application layer).

In some example embodiments, a circuit includes: a processor; a network interface coupled to the processor. The network interface is configured to: maintain a plurality of active secure sessions; identify a priority session trigger; and allocate network interface resources for incoming packets related to the plurality of active secure sessions based on the priority session trigger. In some example embodiments, the circuit includes: a receiver; a memory storing resource coordinator instructions; and a processor (e.g., a network processor separate from a host processor of the circuit) coupled to the receiver and the memory. When executed, the resource coordinator instructions cause the processor to: maintain a plurality of active secure sessions; identify a priority session trigger; and allocate receiver resources for incoming packets related to the plurality of active secure sessions based on the priority session trigger. In some example embodiments, the priority session trigger is based on a comparison of total receiver resources and in-use receiver resources. Additionally or alternatively, the priority session trigger is based on a session record being complete to within a threshold amount. Additionally or alternatively, the priority session trigger is based on incoming packet size and session record size. Other priority session triggers are possible.

Figure 1:
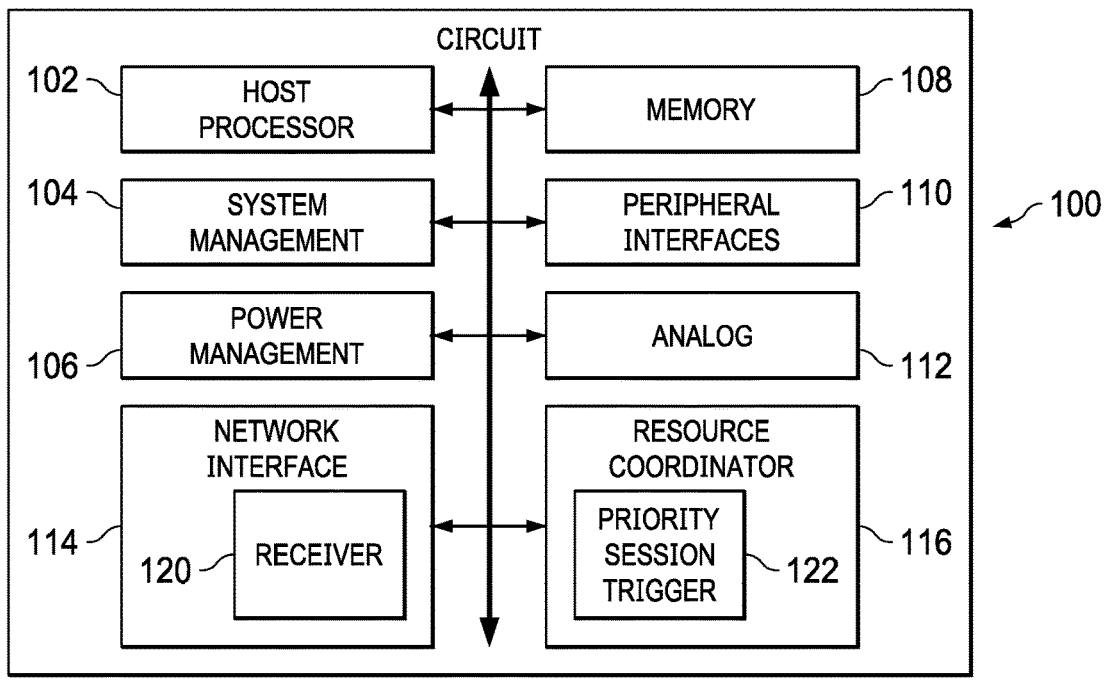
FIG. 1 is a block diagram of a circuit in accordance with an example embodiment.

FIG. 1 is a block diagram of a circuit 100 in accordance with an example embodiment. In some example embodiments, the circuit 100 is an IC or other circuit configured to: run host or user applications; and provide wired or wireless network connectivity to other circuits or devices. For example, an application being executed by the circuit may produce data to be transmitted via a network interface to another circuit and/or may receive data from another circuit via the network interface.

As shown, the circuit 100 includes a host processor 102 configured to execute host applications or user applications. The host applications or user applications are stored in memory 108, which may include random-access memory (RAM) and/or read-only memory (ROM). The host processor 102 may be an Advanced RISC (reduced instruct set computer) Machine or "ARM" processor. In some example embodiments, the host processor 102 includes a Joint Test Action Group (JTAG) interface. The circuit 100 also includes system management components 104. Without limitation, examples of the system management components 104 include: direct memory access (DMA) components, timers, general programmable inputs/output (GPIOs), and oscillators.

In the example of FIG. 1, the circuit 100 also includes power management components 106. Without limitation, examples of the power management components 106 include: power converters (e.g., a direct-current to direct-current converter or "DC-DC" converter), a battery monitor, and/or a hibernation controller. The circuit 100 also includes peripheral interfaces 110. Without limitation, examples of the peripheral interfaces 110 include: a Fast Parallel interface, a serial peripheral interface (SPI), a universal asynchronous receiver-transmitter (UART) interface, an inter-integrated circuit (I2C) interface, a secure digital/MultiMediaCard (SDMMC) interface, an inter-IC sound (I2S) interface, and a pulse-code modulation (PCM) interface.

In the example of FIG. 1, the circuit 100 also includes analog components 112. Without limitation, examples of the analog components 112 include an analog-to-digital converter (ADC), a pulse-width modulator (PWM), and/or other components. The circuit 100 also includes a network interface 114. In some example embodiments, the network interface 114 includes a network processor configured to support network protocols, such as TCP and TLS. The network interface 114 may also include a receiver 120 configured to handle incoming packets in accordance with network protocols. In some example embodiments, the receiver 120 is part of a wireless transceiver.

The circuit 100 also includes a resource coordinator 116. In some example embodiments, the resource coordinator 116 includes resource coordinator hardware and/or instructions, which enables the network interface 114 to: maintain a plurality of active secure sessions; identify a priority session trigger 122; and allocate receiver resources (e.g., related to receiver 120) for incoming packets related to the plurality of active secure sessions based on the priority session trigger 122. The priority session trigger 122 may be based on a comparison of total receiver resources and in-use receiver resources, a session record being complete to within a threshold amount, incoming packet size, session record size, and/or other parameters. In some example embodiments, the incoming packet size is for a TCP packet, and the session record size is for a TLS session record.

In some examples, resource coordinator instructions, when executed, cause a processor (e.g., a network processor of the network interface 114 in FIG. 1) to: identify one of the plurality of active secure sessions as a priority session; and allocate receiver resources to incoming packets related to the priority session before allocating receiver resources to incoming packets related to others of the plurality active secure sessions. As another option, the resource coordinator instructions, when executed, cause a processor to: identify one of the plurality of active secure sessions as a priority session; and prevent allocation of receiver resources to incoming packets related to active secure sessions not identified as the priority session. In some example embodiments, the receiver resources include memory resources, receiver buffers, receiver packets, packet descriptors, control blocks, or other receiver resources.

In the example of FIG. 1, the host processor 102, the memory 108, the system management components 104, the power management components 106, the memory 108, the peripheral interfaces 110, the analog components 112, the network interface 114, and the resource coordinator 116 are coupled together or otherwise in communication to perform the operations of the circuit 100, including resource coordination for active secure sessions and related records and packets.

Figure 2:
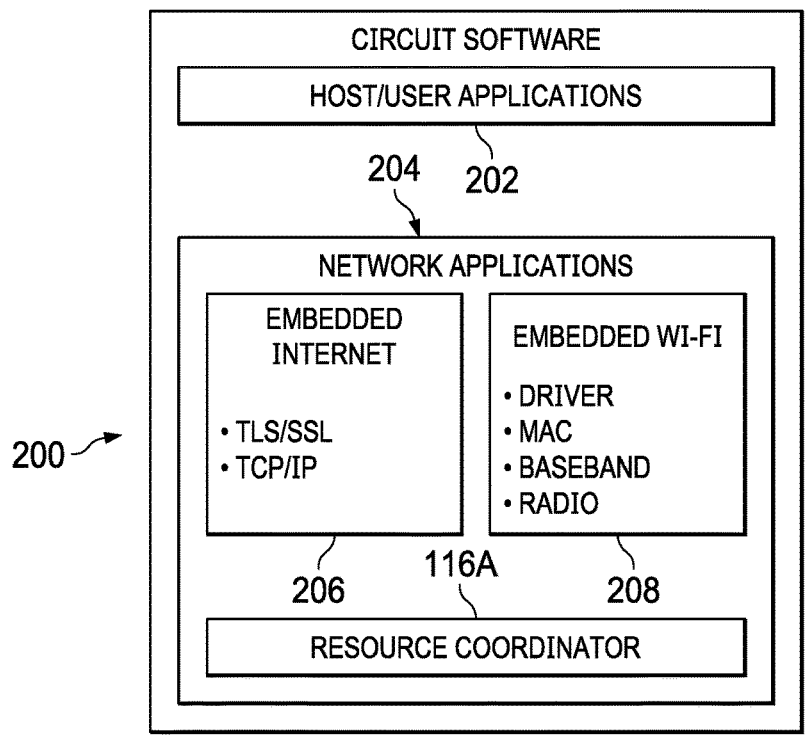
FIG. 2 is a block diagram of circuit software in accordance with an example embodiment.

FIG. 2 is a block diagram of circuit software 200 in accordance with an example embodiment. The circuit software 200 is included, for example, with the circuit 100 of FIG. 1. As shown, the circuit software 200 includes host or user applications 202. Host applications refer to default applications included with the circuit 100. User applications refer to applications added by a user or reseller of the circuit 100. The circuit software 200 also includes network applications 204. In the example of FIG. 2, the network applications 204 include embedded internet applications 206. Without limitation to other example embodiments, the embedded internet applications 206 may include instructions for protocols such as: TLS; secure sockets layer (SSL); TCP; and Internet Protocol (IP). In the example of FIG. 2, the circuit software 200 also includes embedded Wi-Fi applications 208. Without limitation to other example embodiments, the embedded Wi-Fi applications 208 include instructions for a Wi-Fi driver, media access control (MAC), baseband operations, radio operations, and/or related parameters. Additionally or alternatively, wired network communication protocols are supported by the circuit software 200.

In the example of FIG. 2, the circuit software 200 also includes resource coordinator 116A (an example of the resource coordinator 116 in FIG. 1). The resource coordinator 116A includes instructions that, when executed, cause a processor (e.g., a network processor of the network interface 114 in FIG. 1) to: maintain a plurality of active secure sessions; identify a priority session trigger (e.g., the priority session trigger 122 in FIG. 1); and allocate network interface or receiver resources to incoming packets based on a priority session trigger. The priority session trigger may be based on a comparison of total receiver resources and in-use receiver resources, a session record being complete to within a threshold amount, incoming packet size, session record size, and/or other parameters. In some example embodiments, the incoming packet size is for a TCP packet, and the session record size is for a TLS session record.

In some example the resource coordinator 116A, when executed, causes a processor to: identify one of the plurality of active secure sessions as a priority session; and allocate resources to incoming packets related to the priority session before allocating resources to incoming packets related to others of the plurality active secure sessions. As another option, the resource coordinator 116A, when executed, causes a processor to: identify one of the plurality of active secure sessions as a priority session; and prevent allocation of resources to incoming packets related to active secure sessions not identified as the priority session. In some example embodiments, the allocated resources include memory resources, receiver buffers, receiver packets, packet descriptors, control blocks, and/or other receiver resources.

Figure 3:
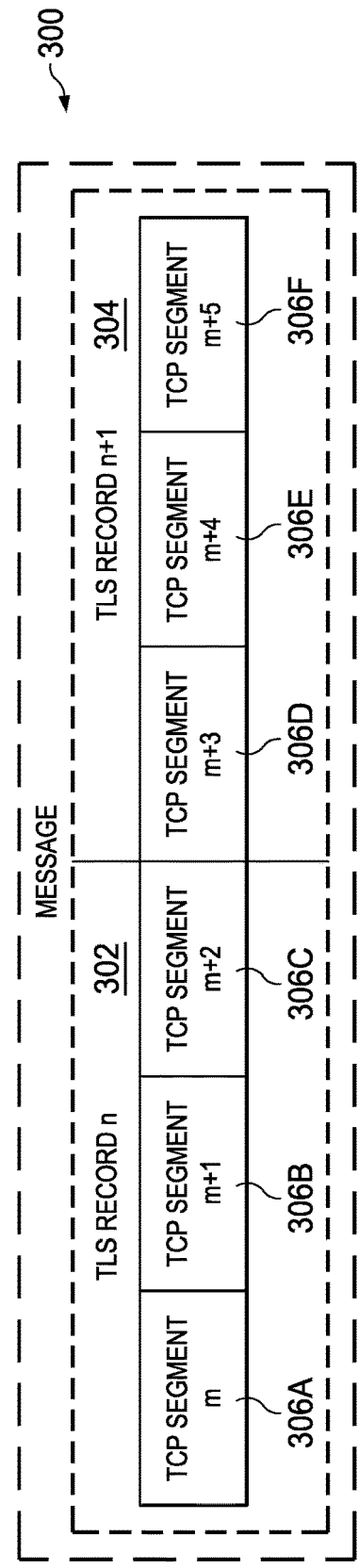
FIG. 3 is a block diagram of network message in accordance with an example embodiment.

FIG. 3 is a block diagram of network message 300 in accordance with an example embodiment. As shown, the network message 300 includes TLS record 302 (labeled "TLS record n") and TLS record 304 (labeled "TLS record n+1"). The TLS record 302 includes TCP segments 306A, 306B, and 306C (labeled "TCP segment m", "TCP segment m+1", and "TCP segment m+2"). The TLS record 304 includes TCP segments 306D, 306E, and 306F (labeled "TCP segment m+3", "TCP segment m+4", and "TCP segment m+5"). With TLS records such as the TLS records 302 and 304, all related segments must be received before the respective TLS record is released to another network interface layer. Conventionally, TLS records are managed by allocating sufficient resources for a limited number of TLS records to be supported at a time. With resource coordination as described herein, the number of TLS records to be supported at a time can be increased relative to conventional approaches without increasing the amount of resources. Instead of allocating resources for each TLS record, resource coordination enables a plurality of active secure sessions to share resources. One example resource coordination strategy involves prioritizing a particular secure session (e.g., related to one of the TLS records 302 and 304) in response to a priority session trigger (e.g., the priority session trigger 122 in FIG. 1) so that the priority session is complete as soon as possible. Once the priority session is complete, the related TLS record is transferred to another layer of the network, which releases the resources allocated to the priority session. Once resources are released, they are available to other secure sessions and/or a subsequent priority session, which may be triggered.

Figure 4:
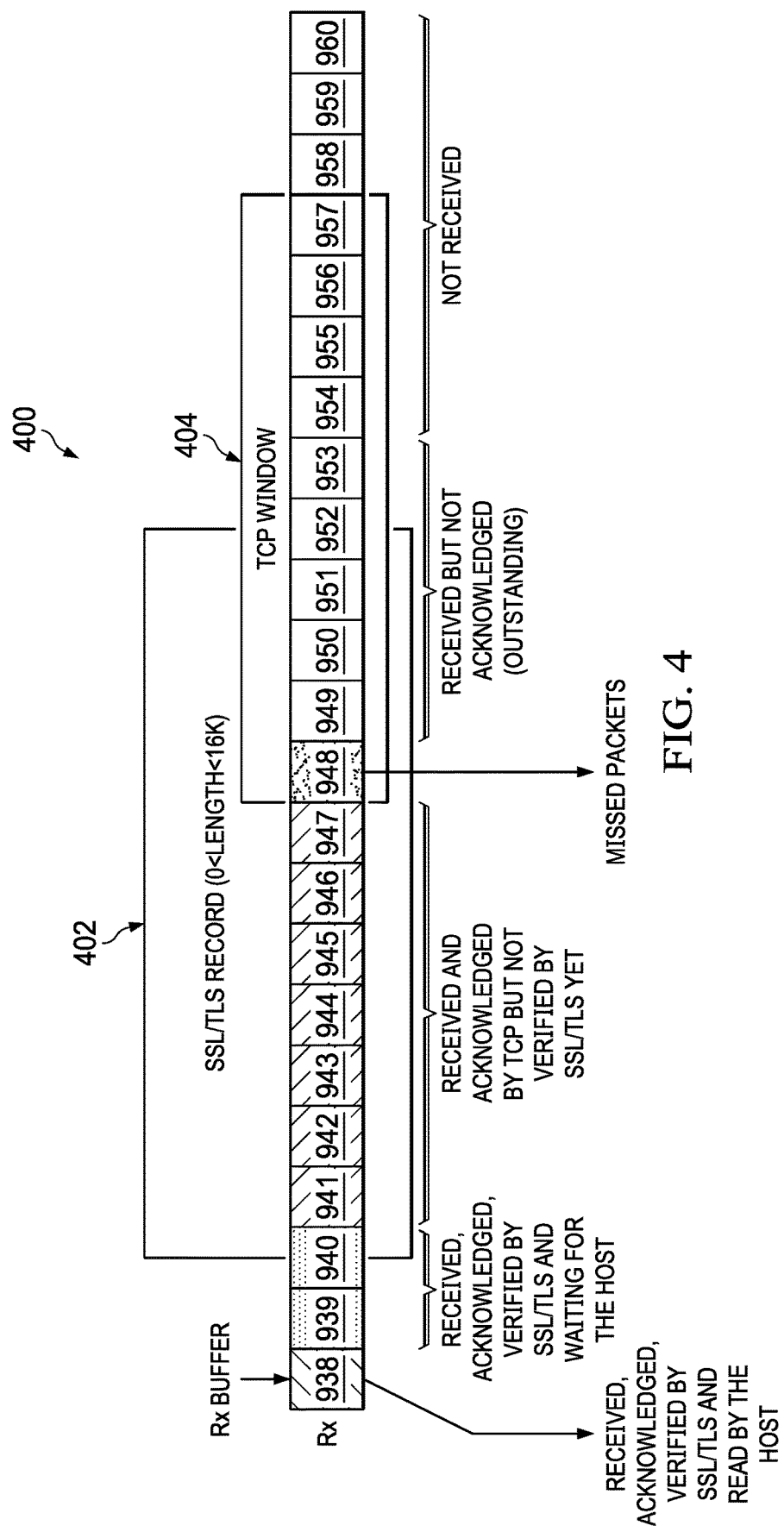
FIG. 4 is a block diagram of a secure session in accordance with an example embodiment.

FIG. 4 is a block diagram of a secure session 400 in accordance with an example embodiment. In the secure session 400, blocks 938-960 are incoming packets, where the status of the incoming packets 938-960 varies. In the example of FIG. 4, the incoming packet 938 is received, acknowledged, verified by SSL/TLS and read by a host layer of a network interface (e.g., the network interface 114 in FIG. 1). The incoming packets 939 and 940 are received, acknowledged, verified by SSL/TLS, and are waiting to be read by a host layer. The incoming packets 939 and 940 are received, acknowledged, verified by SSL/TLS, and are waiting to be read by a host layer of a network interface. The incoming packets 941-947 are received and acknowledged by TCP, but are not yet verified by SSL/TLS. The incoming packet 948 is a missed packet or packets. The incoming packets 949-960 are received and not yet acknowledged.

In the secure session 400, packets 941-951 are part of a SSL/TLS record 402. Accordingly, the TLS record 402 and its related packets 941-951 will not released until all of the packets 941-951 have been received. As the number of secure sessions (e.g., the secure session 400) maintained at a time is increased, the value of resource coordination increases. In the example of FIG. 4, packets 948-957 are part of a TCP window 404. In different example embodiments, the size of the SSL/TLS record 402 and/or the TCP window 404 may vary.

When a TLS connection has been established (i.e. "open" TLS connection), a related circuit or system needs to allocate at least a memory range (e.g., receiver buffers or "Rx" buffers) of 16K bytes for a receiver. Conventionally, every "open" TLS connection requires allocation of at least 16K bytes of Rx buffers, and those Rx buffers cannot be shared between "open" TLS connections. At saturation, less available memory resources will cause a deadlock and TCP disconnection. This conventional approach causes inefficient memory usage due to the inability to share Rx buffers between TLS connections.

Figure 5:
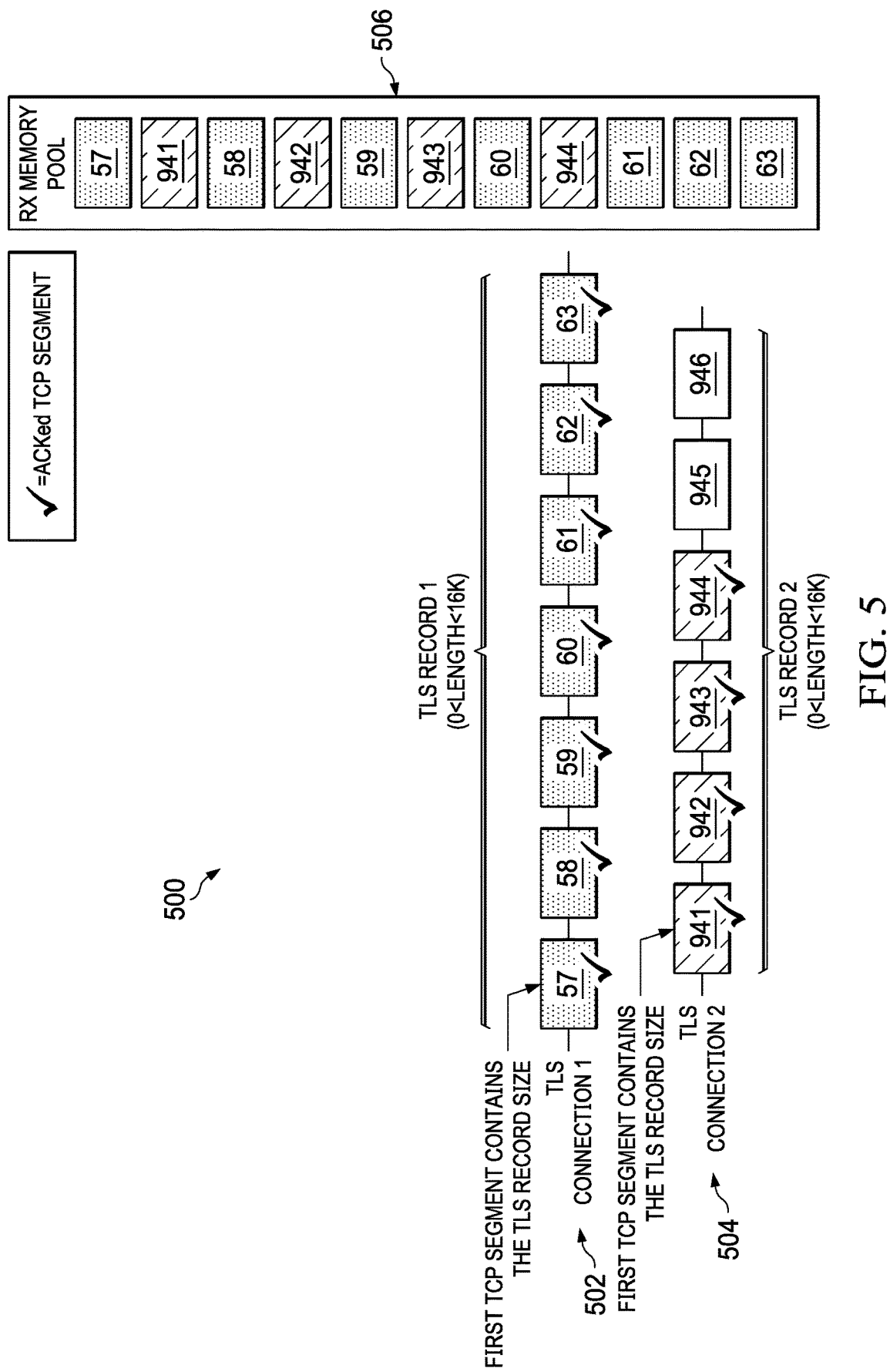
FIG. 5 is a diagram of secure session handling in accordance with an example embodiment.

FIG. 5 is a diagram 500 of secure session handling in accordance with an example embodiment. In the diagram 500, two TLS sessions 502 and 504 with respective packets are again represented along with the Rx memory pool 506. The TLS session 502 includes packets 57-63, and the TLS session 504 includes packets 941-946. In the diagram 500, the TLS session 502 is prioritized based on a priority session trigger (e.g., the priority session trigger 122 in FIG. 1) as described herein. The priority session trigger may be based on a comparison of total receiver resources and in-use receiver resources. Additionally or alternatively, the priority session trigger may be based on a session record being complete to within a threshold amount. Additionally or alternatively, the priority session trigger may be based on incoming packet size and session record size. Other priority session triggers are possible (e.g., time-out values for packets and/or sessions). By prioritizing the TLS session 502, the TLS record for TLS session 502 is completed. Accordingly, the resources of the Rx memory pool 506 related to the TLS record for the TLS session 502 can be released, which frees up space in the RX memory pool 506 for the TLS session 504 and/or other secure sessions.

In some example embodiments, resource coordination enables dynamic Rx buffer allocation with the ability of sharing buffers between multiple "open" TLS connections. With resource coordination, several "open" TLS connections are maintained, where a shared memory pool is used to serve multiple connections simultaneously by dynamic allocation of Rx buffers. The implication is a substantial memory reduction since resource coordination enables the total available memory range for all "open" TLS connections to be much less than the maximum theoretical memory range needed for TLS connections (e.g., the total Rx buffers can be much less than 16K bytes times the number of open TLS connections).

In order to implement resource coordination, a circuit (e.g., the circuit 100 in FIG. 1) or related system adds a resource coordinator (e.g., the resource coordinator 116 in FIG. 1, or the resource coordinator 116A in FIG. 2) to manage TLS connections and Rx memory coordination. The resource coordinator is responsible for dynamic allocation of Rx buffers from a shared memory pool. In some example embodiments, the resource coordinator is aware of the "open" TLS connections memory requirements (i.e. record length) and prioritizes TLS records or related sessions (e.g., TCP sessions) according to the shared memory utilization and other information. As needed, the resource coordinator may use available layer protocol mechanisms, including a TCP flow control mechanism, to signal connected devices and control the data flow according to the selected priority. In one example embodiment, the resource coordinator is able to: increase window size for the selected priority session; or decrease window size and delay TCP ack messages for the non-prioritized sessions. With resource coordination, deadlock (where the total Rx records memory requirements are larger than the shared memory pool) is avoided.

In some example embodiments, the resource coordinator act as a middleware layer between the TCP and the TLS layers. When a TCP segment is received by the TCP layer and before the TCP protocol sends an acknowledge, the resource coordinator rejects or accepts the segment. Example operations of the resource coordinator include: accept an incoming TCP segment if the TCP segment is part of a TLS record and its Rx record requirements can be satisfied by the shared memory pool; or reject an incoming TCP segment and prior unacknowledged TCP segments if a TLS record cannot be satisfied currently by the shared memory pool. As needed, rejected TCP segments will be retransmitted by another circuit, when the related TCP retransmission timers expires.

Conventional approaches may use the following methods: limit the number of "open" TLS connections at a time; have enough memory to serve all open TLS connections simultaneously; and/or let the TCP protocol disconnect a TCP connection when TCP retransmission is expired. In that case, the memory resources for a connection are released and are available for other connections. In contrast, the described resource coordinator controls allocation of Rx buffers based on information related to open connections, upper layer parameters, and/or lower layer parameters. Example information used by the resource coordinator to control allocation of Rx buffers (or other receiver resources) includes: TLS Record size; TCP MSS; TCP window size; historical statistical information on the connection such as round trip time (RTT); number of disconnections; amount of traffic on a session; traffic type and quality of service indicators; first packet reception time; disconnect prediction; and/or other information.

Figure 6:
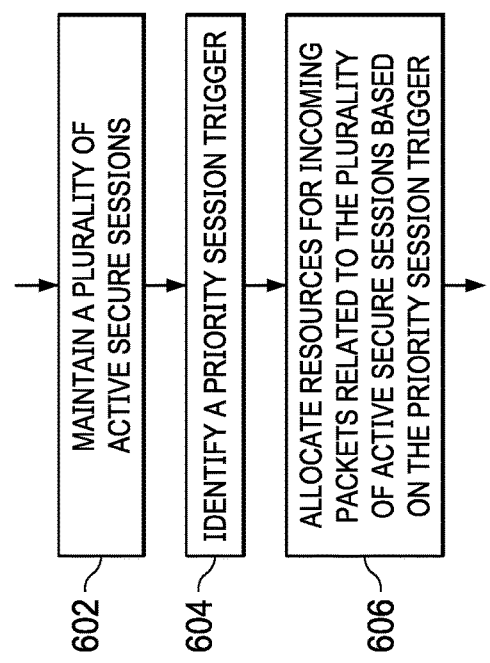
FIG. 6 is a network interface method in accordance with an example embodiment.

FIG. 6 is a network interface method 600 in accordance with an example embodiment. The method 600 is performed, for example, by a circuit 100 or IC with a network interface. As shown, the method 600 includes maintaining a plurality of active secure sessions at block 602. At block 604, a priority session trigger (e.g., the priority session trigger 122 in FIG. 1) is identified. In some example embodiments, identifying a priority session trigger at block 604 involves comparing total receiver resources and in-use receiver resources or determining that a session record is complete to within a threshold amount. At block 606, resources are allocated for incoming packets related to the plurality of active secure sessions based on the priority session trigger.

In some example embodiments, the method 600 also includes: identifying one of the plurality of active secure sessions as a priority session; and prioritizing memory resources to incoming packets related to the priority session over incoming packets related to others of the plurality active secure sessions. In some example embodiments, identifying a priority session trigger involves comparing total receiver resources and in-use receiver resources.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. An integrated circuit comprising:
a processor;
a shared memory pool configured to store Transport Layer Security (TLS) record packets; and
a memory coupled to the processor, the memory storing instructions that, when executed by the processor, cause the processor to:
maintain a plurality of active secure sessions, wherein, during the plurality of active secure sessions, the shared memory pool is configured to allocate some resources of the shared memory pool to store received TLS record packets related to the plurality of active secure sessions;
identify a priority session trigger; and
allocate at least some of remaining resources of the shared memory pool to store incoming TLS record packets related to the plurality of active secure sessions based on the priority session trigger, wherein the priority session trigger is based on an incoming TLS record packet size and a session TLS record size.

2. The integrated circuit of claim 1, wherein the instructions, when executed by the processor, cause the processor to:
identify one of the plurality of active secure sessions as a priority session; and
allocate at least some of the remaining resources of the shared memory pool to incoming TLS record packets related to the priority session before allocating any of the remaining resources of the shared memory pool to incoming TLS record packets related to others of the plurality of active secure sessions.

3. The integrated circuit of claim 2, wherein the instructions, when executed by the processor, cause the processor to:
release previously allocated resources of the shared memory pool responsive to all TLS record packets of a TLS record being received and the TLS record being processed.

4. The integrated circuit of claim 1, wherein the instructions, when executed by the processor, cause the processor to:
identify one of the plurality of active secure sessions as a priority session; and
prevent allocation of any of the remaining resources of the shared memory pool to incoming TLS record packets related to any of the active secure sessions not identified as the priority session.

5. The integrated circuit of claim 1, wherein the priority session trigger is based on a comparison of total resources of the shared memory pool and in-use resources of the shared memory pool.

6. The integrated circuit of claim 1, wherein the priority session trigger is based on a session record being complete to within a threshold amount.

7. The integrated circuit of claim 1, wherein the incoming TLS record packet size is for a Transmission Control Protocol (TCP) packet, and the session TLS record size is for a TLS session record.

8. The integrated circuit of claim 1, wherein the instructions, when executed by the processor, cause the processor to:
release previously allocated resources of the shared memory pool responsive to all TLS record packets of a TLS record being received and the TLS record being processed.

9. The integrated circuit of claim 1, further comprising a receiver coupled to the processor.

10. The integrated circuit of claim 9, wherein the receiver is part of a wireless transceiver.

11. A system comprising:
a processor;
a shared memory pool configured to store Transport Layer Security (TLS) record packets; and
a network interface coupled to the processor, wherein the network interface is configured to:
maintain a plurality of active secure sessions, wherein, during the plurality of active secure sessions, the shared memory pool is configured to allocate some resources of the shared memory pool to store received TLS record packets related to the plurality of active secure sessions;
identify a priority session trigger; and
allocate at least some of remaining resources of the shared memory pool to store incoming TLS record packets related to the plurality of active secure sessions based on the priority session trigger, wherein the priority session trigger is based on an incoming TLS record packet size and a session TLS record size.

12. The system of claim 11, wherein the network interface is configured to:
identify one of the plurality of active secure sessions as a priority session; and
allocate at least some of the remaining resources of the shared memory pool to incoming TLS record packets related to the priority session before allocating any of the remaining resources of the shared memory pool to incoming TLS record packets related to others of the plurality of active secure sessions.

13. The system of claim 11, wherein the network interface is configured to:
identify one of the plurality of active secure sessions as a priority session; and
prevent allocation of any of the remaining resources of the shared memory pool to incoming TLS record packets related to any of the active secure sessions not identified as the priority session.

14. The system of claim 11, wherein the priority session trigger is based on a comparison of total resources of the shared memory pool and in-use resources of the shared memory pool.

15. The system of claim 11, wherein the priority session trigger is based on a session record being complete to within a threshold amount.

16. The system of claim 11, wherein the incoming TLS record packet size is for a Transmission Control Protocol (TCP) packet, and the session TLS record size is for a TLS session record.

17. The system of claim 11, wherein the network interface is configured to:
release previously allocated resources of the shared memory pool responsive to all TLS record packets of a TLS record being received and the TLS record being processed.

18. A method comprising:
maintaining, by an integrated circuit (IC) comprising a network interface and a shared memory pool for storing Transport Layer Security (TLS) record packets, a plurality of active secure sessions using the network interface;
allocating, by the IC, some resources of the shared memory pool to store received TLS record packets related to the plurality of active secure sessions;
identifying, by the IC, a priority session trigger; and
allocating, by the IC, at least some of remaining resources of the shared memory pool to store incoming TLS record packets related to the plurality of active secure sessions based on the priority session trigger, wherein the priority session trigger is based on an incoming TLS record packet size and a session TLS record size.

19. The method of claim 18, further comprising:
identifying one of the plurality of active secure sessions as a priority session; and
prioritizing the remaining resources of the shared memory pool to store incoming TLS record packets related to the priority session over incoming TLS record packets related to others of the plurality of active secure sessions.

20. The method of claim 18, wherein identifying the priority session trigger comprises comparing total resources of the shared memory pool and in-use resources of the shared memory pool.

21. The method of claim 18, wherein identifying the priority session trigger comprises determining that a session record is complete to within a threshold amount.

22. An integrated circuit comprising:
a processor;
a shared memory pool configured to store Transport Layer Security (TLS) record packets; and
a memory coupled to the processor, the memory storing instructions that, when executed by the processor, cause the processor to:
maintain a plurality of active secure sessions, wherein, during the plurality of active secure sessions, the shared memory pool is configured to allocate some resources of the shared memory pool to store received TLS record packets related to the plurality of active secure sessions;
identify a priority session trigger;
allocate at least some of remaining resources of the shared memory pool to store incoming TLS record packets related to the plurality of active secure sessions based on the priority session trigger;
identify one of the plurality of active secure sessions as a priority session when a session record associated with the one of the plurality of active secure sessions is complete to within a threshold amount; and
allocate at least some of the remaining resources of the shared memory pool to incoming TLS packets related to the priority session before allocating any of the remaining resources of the shared memory pool to incoming TLS packets related to others of the plurality of active secure sessions.

23. The integrated circuit of claim 22, wherein the priority session trigger is based on an incoming TLS record packet size and a session TLS record size.

* * * * *